Figure 2:
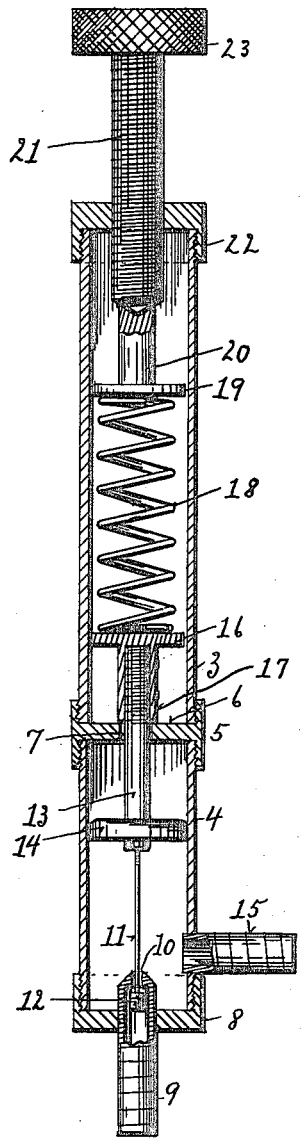

J. G. LUNDHOLM.
AUTOMATIC AIR CUT-OFF.
APPLICATION FILED JAN. 18, 1916.

1,211,731.

Patented Jan. 9, 1917.

Inventor
Joseph G. Lundholm
By J. A. Rosen
Atty

UNITED STATES PATENT OFFICE.

JOSEPH G. LUNDHOLM, OF MILLER, KANSAS.

AUTOMATIC AIR CUT-OFF.

1,211,731. Specification of Letters Patent. Patented Jan. 9, 1917.

Application filed January 18, 1916. Serial No. 72,684.

*To all whom it may concern:*

Be it known that I, JOSEPH G. LUNDHOLM, a citizen of the United States, residing at Miller, in the county of Lyon and State of Kansas, have invented certain new and useful Improvements in Automatic Air Cut-Offs, of which the following is a specification.

My invention is a device to be placed in the pipe line or conduit from a storage reservoir or air pump to a pneumatic tire to shut off the supply automatically when the desired pressure has been obtained in the tire.

The object of the invention is to cut off the supply automatically when the desired pressure is reached in the tire; to provide for adjusting the device so as to make the cut-off operable at any desired pressure within a wide range; and to provide in the same device for testing the air pressure in the tire.

My invention comprises a cut-off valve combined with certain mechanism for effecting the automatic operation of the valve, with means for adjusting the same; and it also comprises the parts, improvements, and combinations hereinafter set forth and claimed.

In the drawings accompanying and forming part of this specification and in the description of the drawings I have shown my invention in its preferred form and what I deem to be the best mode of applying the principles thereof; but it is to be understood that, within the scope of the appended claims, I contemplate changes in form, proportions, and materials, the transposition of parts, and the substitution of equivalent members, without departing from the spirit of my invention.

Figure 1:
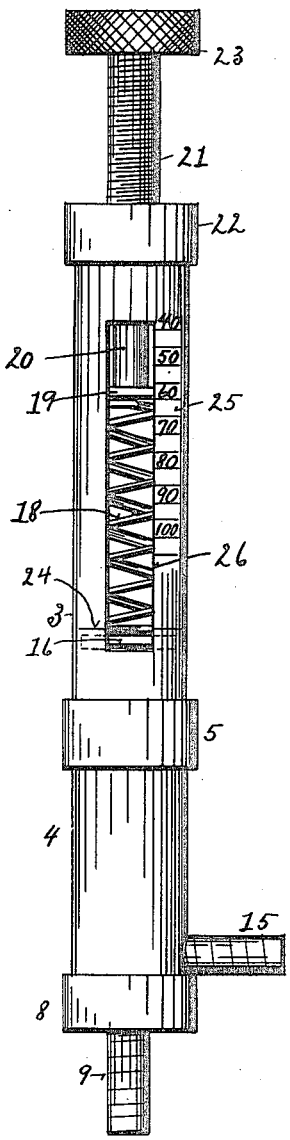

Figure 1 is a side elevation of a device made in accordance with the principles of my invention. Fig. 2 is a central longitudinal sectional elevation.

Similar reference characters indicate similar parts in both views.

For the purposes of assembly and accessibility to interior parts, the main casing or cylinder is formed in two parts, 3, 4, joined together by means of a coupling 5, which is formed with a web 6 having a hole 7 therethrough to serve as an air vent and as a guide for the piston rod 13 presently described. The lower end of the cylinder is closed by a cap 8 through which extends a nipple 9. The inner end of the nipple which extends into the interior of the cylinder has a quite small hole 10 through which extends the valve stem 11 of the valve 12 which is seated in said nipple so as to close and open the passage through said hole. The valve stem is secured to the piston rod 13 which carries the piston 14 and which, as before mentioned, extends through the guide-hole 7. Above the web 6, a head 16 is secured to the piston rod and is formed with a shoulder 17 which bears against the web to limit the downward or opening movement of the piston and valve and connected parts. The shoulder has such relation to the valve that the valve is open when the shoulder so bears against the web. Bearing against the head 16 and tending to force the valve to its open position, is a compression spring 18, which is compressed between that head and the adjusting head 19, which is formed with a stem 20 bearing against the inner end of the adjusting screw 21 whose outer end is formed into a knurled head 23 for easy manipulation by the hand or fingers. The adjusting screw extends through and has screw-threaded engagement with the cap 22 secured on the upper end of the cylinder.

The cylinder wall is formed with a slot 26 extending lengthwise thereof through which the two heads 16 and 19 are visible in their various positions. A mark 24 is placed on the cylinder adjacent to the slot to indicate the position of the head 16 when the valve is in its closed position; and along the edge of the slot and within the range of the movement of the head 19 are suitably designated graduation marks. It will be understood that by screwing down the adjusting screw, the tension of the spring will be increased, and by screwing the screw up, the tension will be diminished. By suitable calculations or tests, the graduation marks are designated to indicate the pressure in the cylinder under the piston at which the piston will be impelled against the tension of the spring to close the valve.

The nipple 9 is connected with the source of supply, as an air pump, or a reservoir containing air at relatively higher pressure; and the nipple 15 is connected, by any suitable conduit with the valve stem of the pneumatic tire.

When the tire is to be inflated or the pressure therein increased, the device is connected in the manner just indicated, and the cut-off in the pipe-line leading to the device is opened, and the air is thus permitted to flow through the device into the tire. Since the pressure in the cylinder is relieved by reason of the opening into the tire, the tension of the spring will keep the valve open until the pressure in the tire and the cylinder has reached approximately the desired pressure indicated by the previous adjustment of the head 19, in the manner hereinbefore described, and at this point such pressure will force the piston up until the head 16 alines with the mark 24 and close the valve 12. The visual indication of the complete inflation at the desired pressure will be the alining of the head 16 with the mark 24. If the pressure in the supply reservoir is relatively very high and particularly if the conduit leading to the tire is restricted, the pressure in the cylinder will be higher than that in the tire during the inflation, and the excess pressure in the cylinder may move the piston upwardly until the valve is almost closed, and this tendency is more pronounced as the pressure in the tire approaches the pressure finally desired. This may leave the attendant in doubt as to whether or not the desired pressure has been attained because of the fact that the head 16 may be near the line 24. But, by momentarily shutting off the supply by closing the cock in the line leading from the supply to the device, the pressures in the cylinder and tire will quickly equalize and the valve completely open, if the desired pressure has not been attained; and, if the desired pressure has been attained, the valve will remain closed. This testing operation is simple, comprising only the momentary turning of the supply line cock to see whether the head 16 remains at the mark 24 or falls back. If it falls back, the cock is opened; and if it is stationary, the tire is inflated and the line may be disconnected.

The device may be quite small so as to be carried on the person if desired, and is readily connectible in the pipe line; its working parts are so simple that it is not apt to get out of order in its proper usage.

Having thus described my invention, what I claim is:

1. In a device of the kind described the combination of a cylinder formed with an air chamber at one end and with a stop, a nipple secured to said cylinder and communicating with said air chamber, a valve in said nipple opening outwardly from said air chamber, said nipple being formed for attachment to and detachment from a source of supply of air under pressure, another nipple secured to said cylinder and communicating with said air chamber and formed for connection with and disconnection from a tire to be inflated, a piston in said cylinder, a rod connecting the valve with the piston whereby the valve is operable in unison with the piston, a piston rod, a head for the piston rod formed with a shoulder engaging said stop for limiting the opening movement of the valve, an adjusting head, a compression spring bearing between said two heads and tending to open the valve, and an adjusting screw to move said adjusting head to increase and diminish the tension of said spring; said cylinder being formed with a slot disclosing said two heads and being inscribed with a designation indicating the position of the head when said valve is closed and with marks indicating the pressure in the air chamber at which the piston will be moved to close the valve according to the several adjustments of the adjusting head.

2. In a device of the kind described, the combination of a cylinder formed with an air chamber in one end, a nipple secured to said cylinder and communicating with said air chamber and formed for connection with a source of supply of air under pressure, a valve in said nipple opening outwardly from said air chamber, another nipple communicating with said air chamber and secured to said cylinder and formed for connection with a tire to be inflated, a piston in said cylinder connected to and operating said valve, a piston rod, a head for the piston rod, an adjusting head, a compression spring bearing between said two heads and tending to open the valve, and an adjusting screw to shift the adjusting head to vary the tension of the spring; said cylinder being formed with an opening in its wall to disclose said two heads and being inscribed with marks to indicate the position of the first-named head when the valve is closed and with marks associated with the adjusting head indicating the pressure necessary to close the valve.

3. In a device of the kind described, the combination of a cylinder formed with an air chamber, means communicating with the air chamber and adapted for connection with a source of supply of air under pressure, a valve in the passage of said communicating means opening outwardly from said chamber, another means communicating with said air chamber and adapted for connection with a tire to be inflated, a piston in said cylinder connected with said valve and operable under pressure of air in said air chamber to close said valve, a piston rod, an adjusting head, a compression spring between the piston rod and the adjusting head, and an adjusting screw to shift the adjusting head, said spring tending to force the valve open, and said cylinder being formed with an opening to disclose the positions of operating parts associated with said valve and said adjusting head.

4. In a device of the kind described, the combination of a casing formed with an air chamber and with a passage adapted for connection with a source of supply of air under pressure and also with a passage from said air chamber adapted for connection with a place to be supplied, a valve in the first-named passage, a piston in said chamber operably connected to said valve and operable by air under pressure in said chamber to close said valve, an adjusting head, a compression spring between the piston and the adjusting head, and an adjusting screw for adjusting said adjusting head; said casing and said adjusting head being formed with externally visible means indicating the closed position of the valve and the position of the adjusting head.

In testimony whereof I have affixed my signature.

JOSEPH G. LUNDHOLM.